United States Patent

Biggs

[11] Patent Number: 5,905,989
[45] Date of Patent: May 18, 1999

[54] KNOWLEDGE MANAGER RELYING ON A HIERARCHICAL DEFAULT EXPERT SYSTEM: APPARATUS AND METHOD

[75] Inventor: Dave Biggs, Minden, Nev.

[73] Assignee: Bently Nevada Corporation, Minden, Nev.

[21] Appl. No.: 08/757,361

[22] Filed: Nov. 27, 1996

[51] Int. Cl.⁶ .................................................. G06F 17/30
[52] U.S. Cl. .............................. 707/104; 395/50; 395/53
[58] Field of Search ............................... 707/1, 100–104, 707/200–206, 205, 5, 10; 395/50–53, 60, 63

[56] References Cited

U.S. PATENT DOCUMENTS

| | | |
|---|---|---|
| 4,591,983 | 5/1986 | Bennett et al. |
| 4,628,435 | 12/1986 | Tashiro et al. |
| 4,644,479 | 2/1987 | Kemper et al. |
| 4,719,586 | 1/1988 | Moyer et al. |
| 4,803,039 | 2/1989 | Impink, Jr. et al. |
| 4,815,014 | 3/1989 | Lipner et al. |
| 4,839,823 | 6/1989 | Matsumoto. |
| 4,853,175 | 8/1989 | Book, Sr. |
| 4,855,923 | 8/1989 | Fullmer. |
| 4,858,102 | 8/1989 | Lovrenich. |
| 4,947,095 | 8/1990 | Kawamura et al. |
| 5,068,080 | 11/1991 | Impink, Jr. et al. |
| 5,099,436 | 3/1992 | McCown et al. |
| 5,119,318 | 6/1992 | Paradies et al. |
| 5,148,363 | 9/1992 | Sakamoto et al. |
| 5,161,110 | 11/1992 | Dorchak. |
| 5,189,604 | 2/1993 | Lovrenich. |
| 5,195,029 | 3/1993 | Murai et al. |
| 5,214,577 | 5/1993 | Sztipanovits et al. |
| 5,216,612 | 6/1993 | Cornett et al. |
| 5,239,547 | 8/1993 | Tomiyama et al. |
| 5,249,260 | 9/1993 | Nigawara et al. |
| 5,251,144 | 10/1993 | Ramamurthi. |
| 5,267,141 | 11/1993 | Morita et al. |
| 5,305,426 | 4/1994 | Ushioda et al. |
| 5,333,240 | 7/1994 | Matsumoto et al. |
| 5,355,444 | 10/1994 | Chirico. |
| 5,398,304 | 3/1995 | Bauman et al. ............................ 395/53 |
| 5,402,526 | 3/1995 | Bauman et al. ............................ 395/53 |
| 5,403,447 | 4/1995 | Jarvinen et al. |
| 5,406,502 | 4/1995 | Haramaty et al. |
| 5,412,756 | 5/1995 | Bauman et al. ............................ 395/50 |
| 5,414,632 | 5/1995 | Mochizuki et al. |
| 5,442,562 | 8/1995 | Hopkins et al. |
| 5,463,545 | 10/1995 | Umeda et al. |
| 5,463,567 | 10/1995 | Boen et al. |
| 5,511,004 | 4/1996 | Dubost et al. |
| 5,521,844 | 5/1996 | Karis. |
| 5,541,832 | 7/1996 | Nakajima et al. |
| 5,557,549 | 9/1996 | Chang. |
| 5,559,691 | 9/1996 | Monta et al. |
| 5,561,610 | 10/1996 | Schricker et al. |
| 5,617,514 | 4/1997 | Dolby et al. ............................... 395/51 |
| 5,630,025 | 5/1997 | Dolby et al. ............................... 395/51 |
| 5,659,743 | 8/1997 | Adams et al. ............................. 707/205 |

*Primary Examiner*—Ruay Lian Ho
*Attorney, Agent, or Firm*—Bernhard Kreten

[57] ABSTRACT

A knowledge manager relying on a hierarchical default expert system is provided including a class hierarchical data base which may be appended to without affecting the class hierarchy and which will address the appended matter first to supersede any previous knowledge in the class hierarchy data base of the system. In addition, the system parameters of assets are appended to the system and are instantiated into objects which are then treated with an object-oriented paradigm. Thus, specific assets which are found throughout a plant may be defined as objects. These objects may be appended to the system without the proprietary information which they contain being disclosed to unauthorized personnel and override, add or delete information to the class hierarchical database.

16 Claims, 5 Drawing Sheets

DETAILS OF SEVERITY/FAULT CATEGORY CONFIGURATION

FAULT CATEGORY

| SEVERITY | | MACHINE | INSTRUMENT | PROCESS |
|---|---|---|---|---|
| | 0 | __ OPERATOR<br>__ MACHINERY MAINTENANCE DEPT.<br>__ INSTRUMENT AND CONTROLS DEPT.<br>__ PLANT MANAGER<br>__ SUPPLIER<br>__ OUTSIDE CONTRACTOR<br>__ ETC. | __ OPERATOR<br>__ MACHINERY MAINTENANCE DEPT.<br>__ INSTRUMENT AND CONTROLS DEPT.<br>__ PLANT MANAGER<br>__ SUPPLIER<br>__ OUTSIDE CONTRACTOR<br>__ ETC. | __ OPERATOR<br>__ MACHINERY MAINTENANCE DEPT.<br>__ INSTRUMENT AND CONTROLS DEPT.<br>__ PLANT MANAGER<br>__ SUPPLIER<br>__ OUTSIDE CONTRACTOR<br>__ ETC. |
| | 1 | __ OPERATOR<br>X MACHINERY MAINTENANCE DEPT.<br>__ INSTRUMENT AND CONTROLS DEPT.<br>__ PLANT MANAGER<br>__ SUPPLIER<br>__ OUTSIDE CONTRACTOR<br>__ ETC. | __ OPERATOR<br>__ MACHINERY MAINTENANCE DEPT.<br>X INSTRUMENT AND CONTROLS DEPT.<br>__ PLANT MANAGER<br>__ SUPPLIER<br>__ OUTSIDE CONTRACTOR<br>__ ETC. | X OPERATOR<br>__ MACHINERY MAINTENANCE DEPT.<br>__ INSTRUMENT AND CONTROLS DEPT.<br>__ PLANT MANAGER<br>__ SUPPLIER<br>X OUTSIDE CONTRACTOR<br>__ ETC. |
| | 2 | __ OPERATOR<br>X MACHINERY MAINTENANCE DEPT.<br>__ INSTRUMENT AND CONTROLS DEPT.<br>__ PLANT MANAGER<br>X SUPPLIER<br>__ OUTSIDE CONTRACTOR<br>__ ETC. | X OPERATOR<br>__ MACHINERY MAINTENANCE DEPT.<br>X INSTRUMENT AND CONTROLS DEPT.<br>__ PLANT MANAGER<br>__ SUPPLIER<br>__ OUTSIDE CONTRACTOR<br>__ ETC. | X OPERATOR<br>__ MACHINERY MAINTENANCE DEPT.<br>__ INSTRUMENT AND CONTROLS DEPT.<br>__ PLANT MANAGER<br>__ SUPPLIER<br>X OUTSIDE CONTRACTOR<br>__ ETC. |
| | 3 | X OPERATOR<br>X MACHINERY MAINTENANCE DEPT.<br>__ INSTRUMENT AND CONTROLS DEPT.<br>__ PLANT MANAGER<br>X SUPPLIER<br>__ OUTSIDE CONTRACTOR<br>__ ETC. | X OPERATOR<br>__ MACHINERY MAINTENANCE DEPT.<br>X INSTRUMENT AND CONTROLS DEPT.<br>__ PLANT MANAGER<br>X SUPPLIER<br>__ OUTSIDE CONTRACTOR<br>__ ETC. | X OPERATOR<br>__ MACHINERY MAINTENANCE DEPT.<br>__ INSTRUMENT AND CONTROLS DEPT.<br>X PLANT MANAGER<br>__ SUPPLIER<br>X OUTSIDE CONTRACTOR<br>__ ETC. |
| | 4 | X OPERATOR<br>X MACHINERY MAINTENANCE DEPT.<br>__ INSTRUMENT AND CONTROLS DEPT.<br>X PLANT MANAGER<br>X SUPPLIER<br>X OUTSIDE CONTRACTOR<br>__ ETC. | X OPERATOR<br>__ MACHINERY MAINTENANCE DEPT.<br>X INSTRUMENT AND CONTROLS DEPT.<br>X PLANT MANAGER<br>X SUPPLIER<br>__ OUTSIDE CONTRACTOR<br>__ ETC. | X OPERATOR<br>__ MACHINERY MAINTENANCE DEPT.<br>__ INSTRUMENT AND CONTROLS DEPT.<br>X PLANT MANAGER<br>__ SUPPLIER<br>X OUTSIDE CONTRACTOR<br>__ ETC. |

*Fig. 4*

DETAILS OF ASSET CONFIGURATION DATA BASE

| ASSET IDENTIFICATION NUMBER | ASSET SUPPLIER | OUTSIDE SERVICE PROVIDER | OTHER INFORMATION |
|---|---|---|---|
| COMPRESSOR 102<br>VALVE 23B<br>PUMP c35H | XYZ COMPANY<br>xyz COMPANY<br>123 COMPANY | abc COMPANY<br>ABC COMPANY<br>789 COMPANY | |

KNOWLEDGE MANAGER RELYING ON A HIERARCHICAL DEFAULT EXPERT SYSTEM: APPARATUS AND METHOD

FIELD OF THE INVENTION

The present invention relates generally to a knowledge manager relying on a hierarchical default expert system and, in particular, to an interactive integrated expert system for protecting and managing machinery or assets.

BACKGROUND OF THE INVENTION

Process management systems are known for monitoring and controlling processes in order to obtain in optimum operation and control thereof. After decades of refining and improving these process management systems, industries are learning that the gains coming out of the process management systems are reaching a diminishing set of returns. Therefore, other areas of system management need to be addressed for industries to meet the immense challenge of remaining competitive.

One key area of industrial plant management lies in the ability to manage assets of the plant. For example, in industrial plants like petrochemical plants and power generation plants, it is a challenge to ensure that unusual events get managed using past learning experience and according to a specific procedure. There are many different roles in an industrial plant's organization making the management challenge complex. It is possible that one group of people is responsible for the operation of the plant, another group is responsible for the maintenance of machinery, and yet another group is responsible for the maintenance of instrumentation. Unusual events are not repetitive enough to keep people's memory of the procedures refreshed. To make matters worse, many unusual events occur so infrequently that people who managed and learned from the last situation have either changed jobs or are not available by the time a similar event occurs again.

Many times these events can have profound impact if not managed correctly. Improper management of one of these infrequent events may cause loss of life, loss of property, fugitive emissions and other undesirable consequences. Therefore, what is needed is a system which, inter alia, helps people at the time of the event remember what needs to be done and what has been learned before in similar or related events.

Furthermore, an asset management system is needed which maximizes an asset's life while minimizing its cost. Thus, the asset management system may be used in combination with a process management system to optimize assets and processes simultaneously to maximize profits.

However, a typical plant employing an asset management system will require more information input than was required with just the process management system. Therefore, a problem exists in providing an inexpensive media which will transfer information from the added multiplicity of sensors or measuring points to a central location of the system. For example, in order to manage a process in a plant there may have been one thousand sensors and now what is needed is five thousand sensors to manage the process and assets of the plant. The information from the sensors or measuring points are typically coupled to a central location via a field bus. The field bus standard today allows for six units or sensors coupled per wire. This is limited by the fact that the sensors coupled to the bus have to remain on all the time in order that they provide the proper control functions to the sensors. Therefore, these field buses are serving a dual purpose in controlling the various sensors and feeding back information of their operation. In an intrinsically safe environment the field bus may be allowed to only be coupled to four units or sensors to meet the low power requirements required in this type of environment. Thus, a need exists for a field bus which allows for a large number of sensors to be operatively coupled thereto such that installation and hardware cost may be lowered while retaining a field bus system which remains operable in an intrinsically safe environment.

In today's modern industrial plants the assets of the plant are provided by a variety of different manufacturers. Therefore, the deep knowledge base of an individual asset is usually of a proprietary nature. Thus, problems exist in obtaining the deep knowledge of a particular asset and incorporating it into an asset management system without the proprietary information being divulged for the benefit of the asset manufacturer's competitor. Thus, a need exists for a system to be appendable without the deep knowledge of any particular asset being disseminated and without interfering with the operation of the overall system.

In addition, a need exists for an asset management system which gives the right people concise information at appropriate times so that they are able to make correct decisions.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 4,591,983 | May 27, 1986 | Bennett et al. |
| 4,628,435 | December 9, 1986 | Tashiro et al. |
| 4,644,479 | February 17, 1987 | Kemper et al. |
| 4,719,586 | January 12, 1988 | Moyer et al. |
| 4,803,039 | February 7, 1989 | Impink, Jr. et al. |
| 4,815,014 | March 21, 1989 | Lipner et al. |
| 4,839,823 | June 13, 1989 | Matsumoto |
| 4,853,175 | August 1, 1989 | Book, Sr. |
| 4,855,923 | August 8, 1989 | Fullmer |
| 4,858,102 | August 15, 1989 | Lovrenich |
| 4,947,095 | August 7, 1990 | Kawamura et al. |
| 5,068,080 | November 26, 1991 | Impink, Jr. et al. |
| 5,099,436 | March 24, 1992 | McCown et al. |
| 5,119,318 | June 2, 1992 | Paradies et al. |
| 5,148,363 | September 15, 1992 | Sakamoto et al. |
| 5,161,110 | November 3, 1992 | Dorchak |
| 5,189,604 | February 23, 1993 | Lovrenich |
| 5,195,029 | March 16, 1993 | Murai et al. |
| 5,214,577 | May 25, 1993 | Sztipanovits et al. |
| 5,216,612 | June 1, 1993 | Cornett et al. |
| 5,239,547 | August 24, 1993 | Tomiyama et al. |
| 5,249,260 | September 28, 1993 | Nigawara et al. |
| 5,251,144 | October 5, 1993 | Ramamurthi |
| 5,267,141 | November 30, 1993 | Morita et al. |
| 5,305,426 | April 19, 1994 | Ushioda et al. |
| 5,333,240 | July 26, 1994 | Matsumoto et al. |
| 5,355,444 | October 11, 1994 | Chirico |
| 5,403,447 | April 4, 1995 | Jarvinen et al. |
| 5,406,502 | April 11, 1995 | Haramaty et al. |
| 5,414,632 | May 9, 1995 | Mochizuki et al. |
| 5,442,562 | August 15, 1995 | Hopkins et al. |
| 5,463,545 | October 31, 1995 | Umeda et al. |
| 5,463,567 | October 31, 1995 | Boen et al. |
| 5,511,004 | April 23, 1996 | Dubost et al. |
| 5,521,844 | May 28, 1996 | Karis |
| 5,541,832 | July 30, 1996 | Nakajima et al. |
| 5,557,549 | September 17, 1996 | Chang |

-continued

| PATENT NO. | ISSUE DATE | INVENTOR |
|---|---|---|
| 5,559,691 | September 24, 1996 | Monta et al. |
| 5,561,610 | October 1, 1996 | Schricker et al. |

SUMMARY OF THE INVENTION

The present invention is distinguished over the known prior art in a multiplicity of ways. For one thing, the present invention provides a knowledge manager relying on a hierarchical expert system which, inter alia, reminds people of procedures and past learning events such that they can be employed to manage present events which require attention. In addition, the present invention provides an indication of who should be involved with the event, the priority of the event and the accessibility to information on how to analyze the event. Moreover, the present invention provides tools to record knowledge learned from an event for future use. Therefore, the system may be used by managers and line people to define the way an enterprise should respond to an event, and to make this information available for future events and other people.

The present invention is also distinguished in that it may be used in combination with a process management system to optimize assets and processes simultaneously to maximize profits. In addition, the present invention employs a dedicated information only field bus in addition to retaining any dual purpose control/information buses which are present in the plant. Thus, the installation and hardware cost may be lowered while providing an information field bus which can support a large number of sensors while safely remaining operable in an intrinsically safe environment.

Furthermore, the present invention solves the problem of obtaining enough specific information on sensors, instruments, machinery and processes of a plant to generate a knowledge base and rule set which is complete enough to be used to yield accurate assessments of specific malfunctions.

The present invention solves this problem by providing an appendable data base. Thus, specific proprietary information in addition to general information on, inter alia, sensors, instruments, machinery and processes of a plant can be assembled into a comprehensive knowledge base and rule set system to yield accurate assessments of specific malfunctions in the plant.

In one preferred form, the knowledge manager relying on a hierarchical default expert systems includes a processor system comprising an expert system shell, logic processor means, inference engines and knowledge bases. In addition, the system includes a first stage processor and knowledge base system operatively coupled to input means which allow knowledge modules, configuration parameters and user inputs to be inputted to the first stage system. Further, the first stage system is operatively coupled to an information extractor and a message routing system.

The information extractor is operatively coupled to sensors to receive raw data therefrom and extract key parameters which are inputted into the first stage system. Thus, the information received from, inter alia, the extractor, the knowledge modules, the configuration parameters and the user inputs are processed by the processor system in cooperation with the first stage system and then communicated to the message routing system to be processed and routed to respective personnel.

OBJECTS OF THE INVENTION

An object of the present invention is to provide a new and novel system for inputting parameter and rule sets in a hierarchical system and using these parameter and rule sets to monitor assets and notify appropriate entities of the results of the monitoring.

It is a further object of the present invention to provide a device as characterized above which preserves the assets in an industrial environment.

It is an further object of the present invention to provide a device characterized above which is the beneficiary of knowledge from prior past similar experiences.

It is a further object of the present invention to provide a device characterized above which benefits from past analyses even though people performing past analyses are no longer available in the present event.

It is further object of the present invention to provide a device characterized above in which once set up, the system can monitor subsequent stimuli without undue intervention.

Viewed from a first vantage point, it is the object of the present invention to provide means for incorporating prior relevant experiences and knowledge into a management system, comprising in combination: a hierarchical data base with means for weighting and adhering to certain rule sets while overriding other rule sets, input means which senses systems to be sampled and coupled to the data base, and output coupled to the data base including selection means to target the output only to relevant entities.

Viewed from a second vantage point, it is the object of the present invention to provide a method for protecting individual assets, comprising the steps of: loading information into a shell of an expert system such that the expert system receives hierarchical rule sets some of which are used to analyze asset information, monitoring assets and transmitting asset information to the expert system, reporting to entities from the expert system who need to act on information processed by the expert system.

These and other objects will be made manifest when considering the following detailed specification when taken in conjunction with the appended drawing figures.

BRIEF DESCRIPTION OF THE DRAWINGS

FIGS. 4 and 4A are tables detailing severity and fault category and asset configurations.

DESCRIPTION OF PREFERRED EMBODIMENTS

Considering the drawings, wherein like reference numerals denote like parts throughout the various drawing figures, reference numeral 10 is directed to a knowledge manager relying on a hierarchical default expert system.

Figure 1:
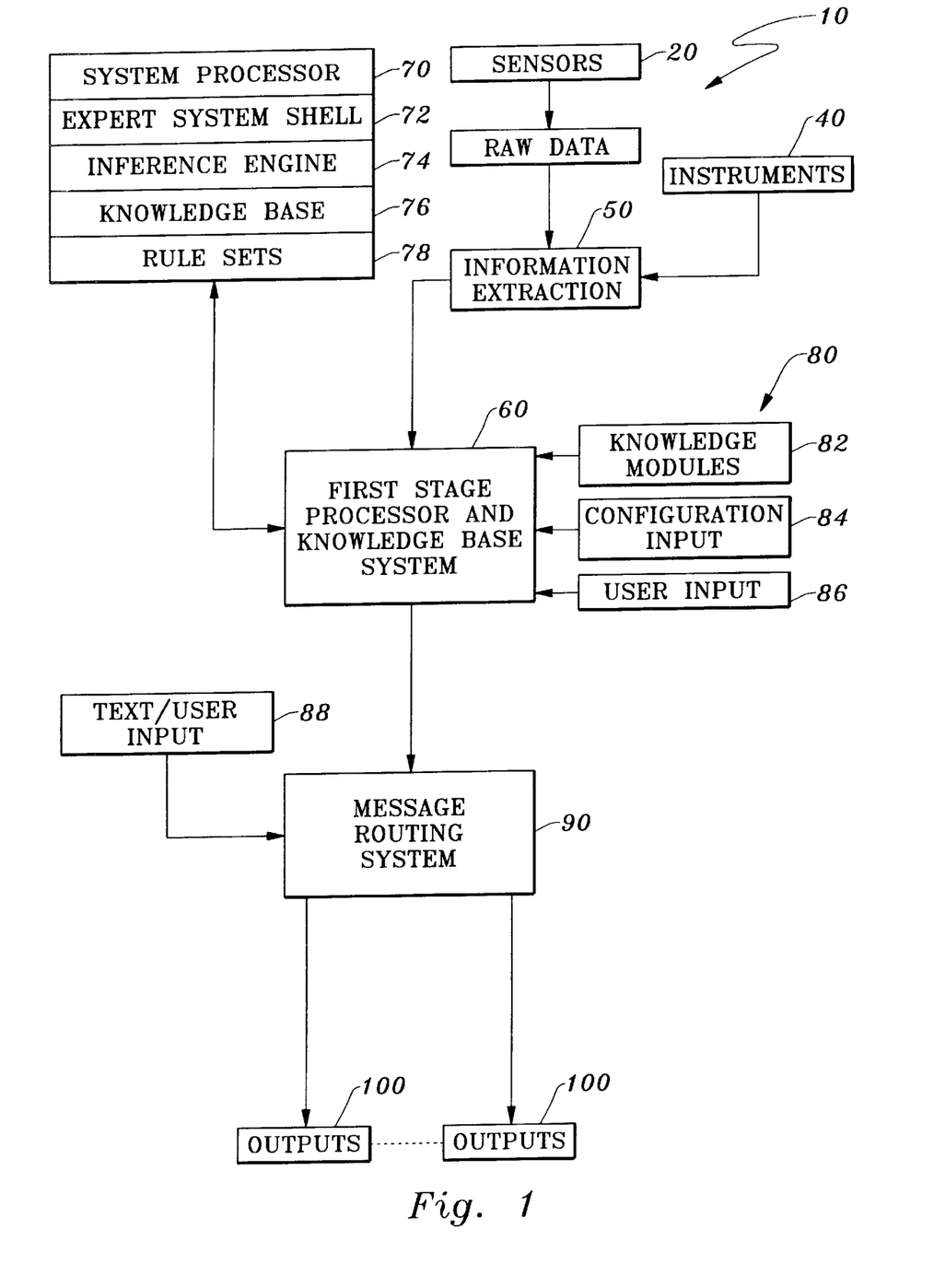
FIG. 1 is a diagrammatic view of a system according to the present invention.

In essence and referring to FIG. 1, a knowledge manager relying on a hierarchical default expert system 10 is operatively coupled to a multiplicity of sensors 20 monitoring the assets of an industrial plant. Preferably, a signal conditioning/processor or extractor 50 is interposed between the sensors 20 and the system 10. The extractor 50 is used to receive raw data from the sensors 20 and extract key parameters which are processed and stored into a first stage processor and knowledge base system 60. The first stage 60 then communicates this information, as it is asked for, over to a system processor 70 and system shell 72. This information, in addition to any input from input means 80, is used by the processor 70 and system shell 72 to obtain conclusions about the condition of the sensors, instruments, machinery and processes.

The conclusions about the condition of the sensors, instruments, machinery and processes and the severity of any problems along with conclusions from other systems and configuration information from other data bases is sent to a message routing system 90 and processed to determine who should receive what information in what time frame to appropriately respond to the situation.

Figure 2:
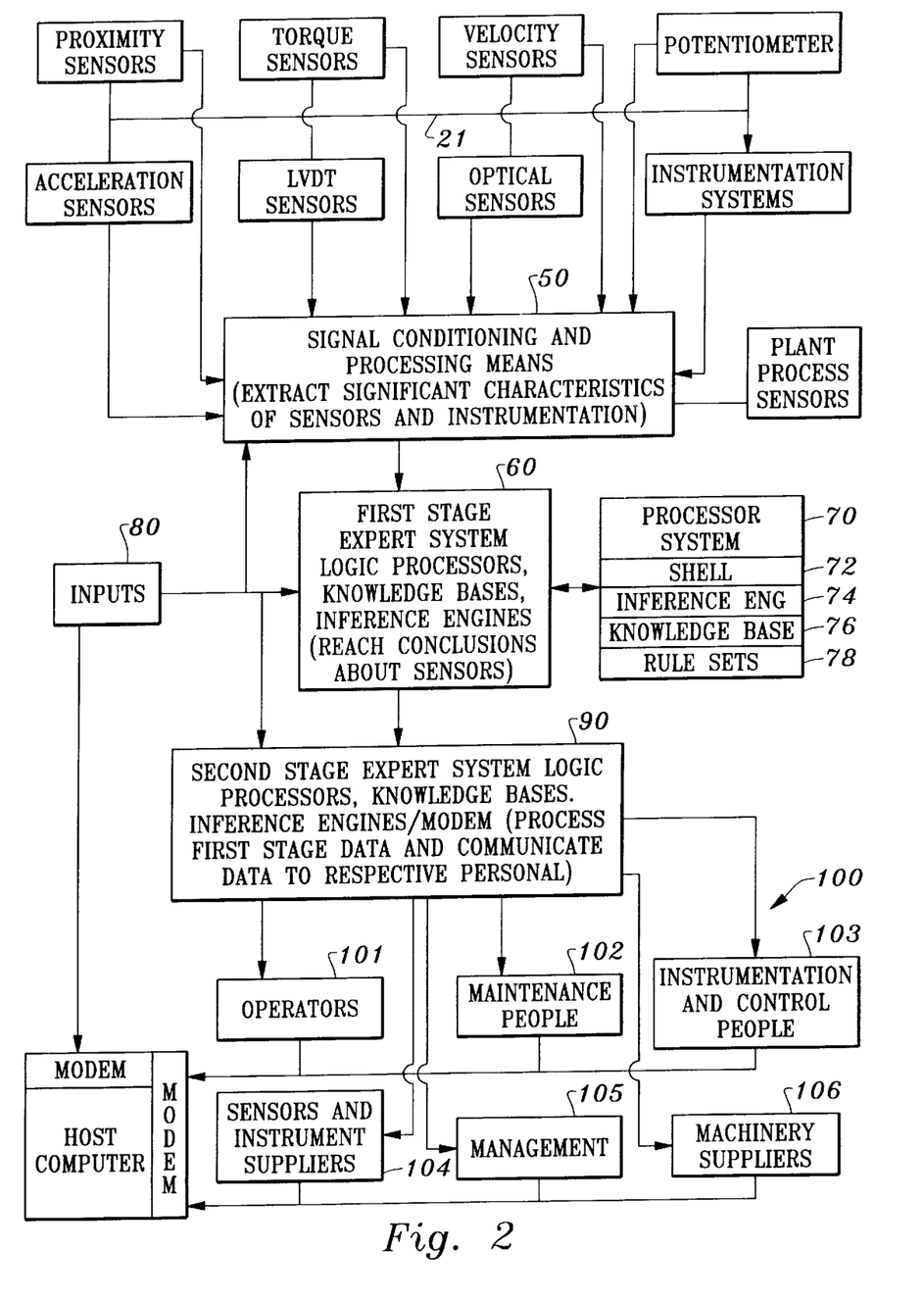
FIG. 2 is a diagrammatic view of the system showing further detail.

More specifically, and referring to FIGS. 1 and 2, the system 10 includes an expert system shell 72 having an object-oriented paradigm. The present invention uses this shell 72 in cooperation with the system processor 70 to build a framework of a class hierarchical knowledge base system 76. A general description of the attributes or properties of each asset in a plant to be managed and a rule set for operating on these attributes are defined into classes which reside at the top of the hierarchical knowledge base system 76. The next level down in the hierarchical knowledge base system allows sub-classes to be appended to the hierarchical classes. Thus, a more specific description of the attributes of each asset in a plant and the methodology for operating on these attributes may be defined into sub-classes which inherit everything in the upper class from which they depend.

For example, an upper class may be defined generally as pump and a sub-class may be created called a water pump which depends therefrom. Thus, the sub-class called water pump inherits the defined attributes and methods defined in the hierarchical class called pumps. Thus, a specific type of water pump may be appended to the upper level of the hierarchy and would inherit and reuse all necessary information contained within the hierarchical class called pump. In addition, the sub-class may be defined to add, delete or redefine the attributes and rule sets in the upper class called pumps.

Once the upper classes have been defined the specific assets in a specific plant may be configured as objects. The attributes and rule sets of these objects are written into a first stage processor and knowledge base system 60 and piped over to the expert system shell via a bridge and are instantiated into objects to be processed by the object-oriented paradigm of the expert system shell 72.

Objects are appended into the system 10 by using configuration, user and knowledge module input means 80 which are operatively coupled to the first stage 60. Preferably, the knowledge modules 82 are memory means on which proprietary attributes and methodology of a specific type of asset have been stored. The first stage processor and knowledge base system 60 simply reads the information off the modules 82 and pipes the information over to the system processor 70 and shell 72 where it is instantiated into objects which represent the specific asset. This process is accomplished without any trade secrets contained in the modules 82 being disclosed. The configuration and user inputs 84, 86 are used to directly insert configuration information and any other necessary information regarding assets to be managed. This information is handled in the same way as is the information contained on the modules 82.

Thus, each time an audit is to be performed a set of raw data is obtained from the sensors 20 representative of the conditions of the assets within a machine train for providing a snapshot in time of what is occurring in the machine train. A dedicated information only field bus 21 is preferably employed in combination with any preexisting field busses to transfer new data to the extractor 50. The extractor 50 extracts key parameters from the raw data and transfers the key parameters to the first stage 60. The first stage 60 in turn transfers the key parameters to the system processor 70 and the expert system shell 72 where the parameters are processed and the rule sets 78 combine and integrate the information assembled by the knowledge base 76. The conclusions drawn from the object-processed parameters are then sent back to the first stage 60 and then to a message routing system 90 which is customizable to route the specific conclusions to respective personnel.

Figure 3:
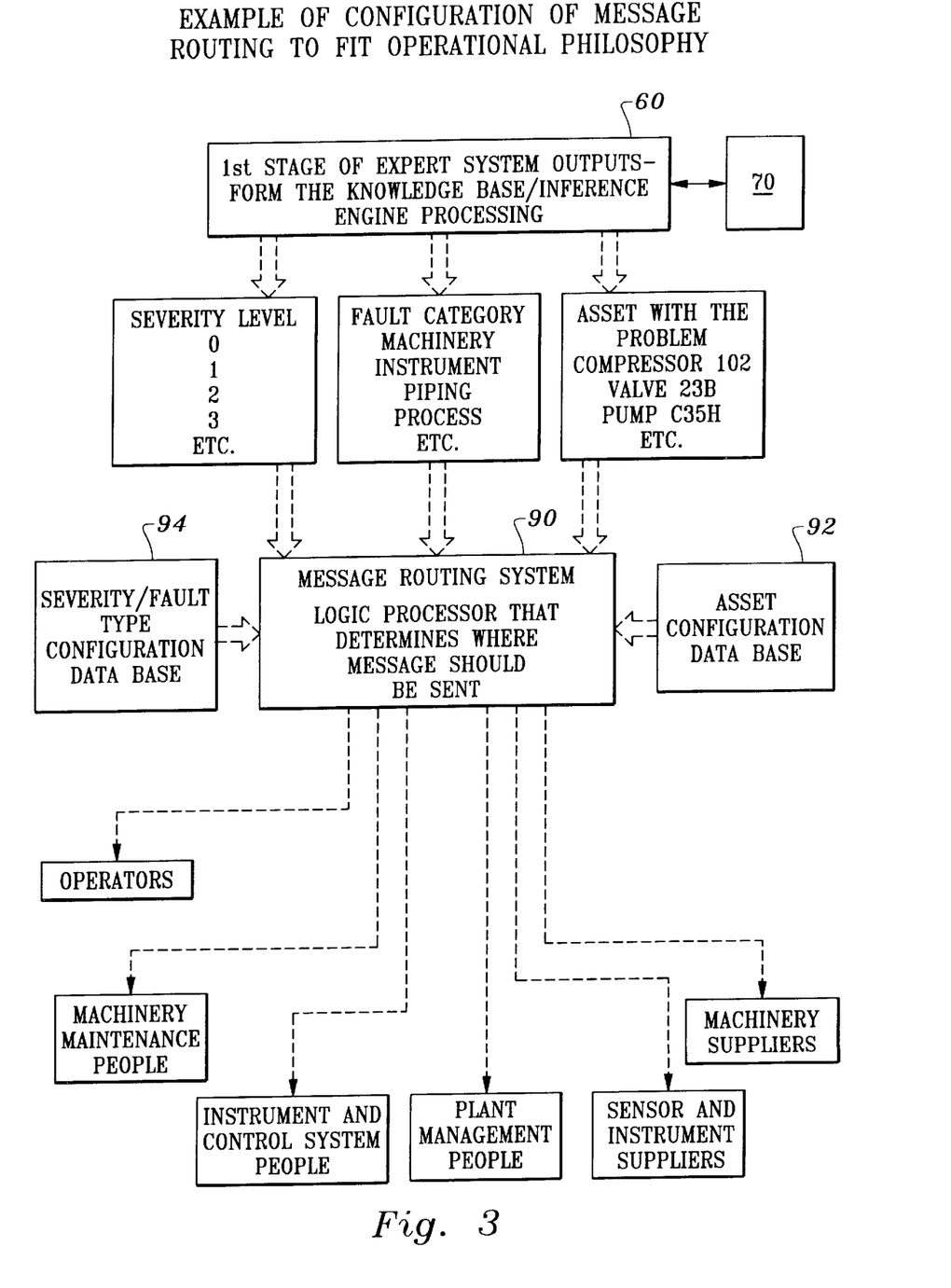
FIG. 3 is a diagrammatic view of a message routing system according to the present invention.

Referring to FIG. 3, the first stage 60 of the system 10 outputs a plurality of signals the message routing system 90 which determines where to output a message correlative to an actionable demand by the assets. The first stage 60 of the system 10 outputs a severity level signal, a fault category signal and an asset with problem signal to the message routing system 90. The severity level may be defined as zero severity, one severity, two severity, etc. The fault category output may contain information on sensors, machinery, instruments, and processes. The asset with problem output contains the information on the specific asset, for example a compressor having a pump with a faulty valve.

Figure 4A:
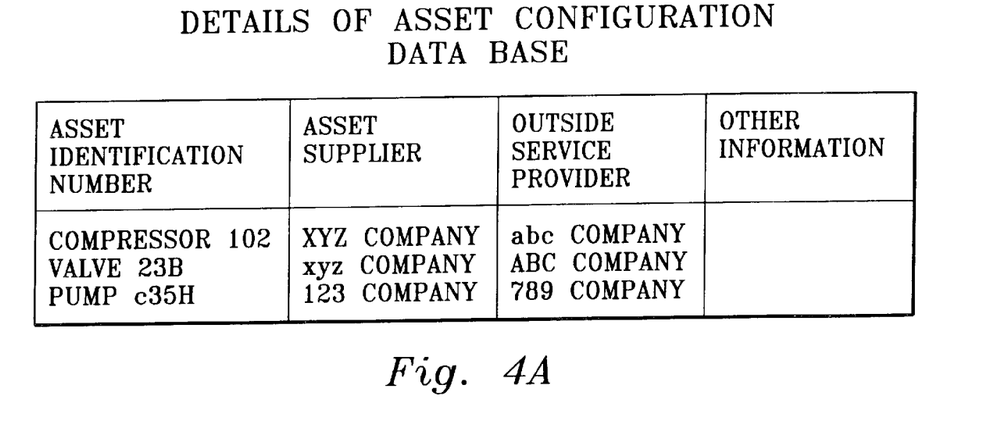

The message routing system 90 also receives information from a severity/fault-type configuration data base 92 and an asset configuration data base 94. The routing system 90 then determines where the message should be routed. For example, the message may be routed to one or more of the following: operators 101, machinery maintenance people 102, instrument and control system people 103, plant management people 105, sensor and instrument suppliers 104 and machinery suppliers 106. For example, if the asset is a machine and the severity level is one the machinery maintenance department would receive an advisory. If the asset was an instrument and the severity level was one the instrument and control departments would receive an advisory. If a process had a level one severity the operator and an outside contractor would receive an advisory. The tables shown in FIGS. 4 and 4A outline the details of severity, the fault category configuration and the asset configuration data base according to one methodology of the system 10. The message routing system 90 may use pagers, computer and modem systems, E-mail and phones to remotely route messages.

Figure 5:
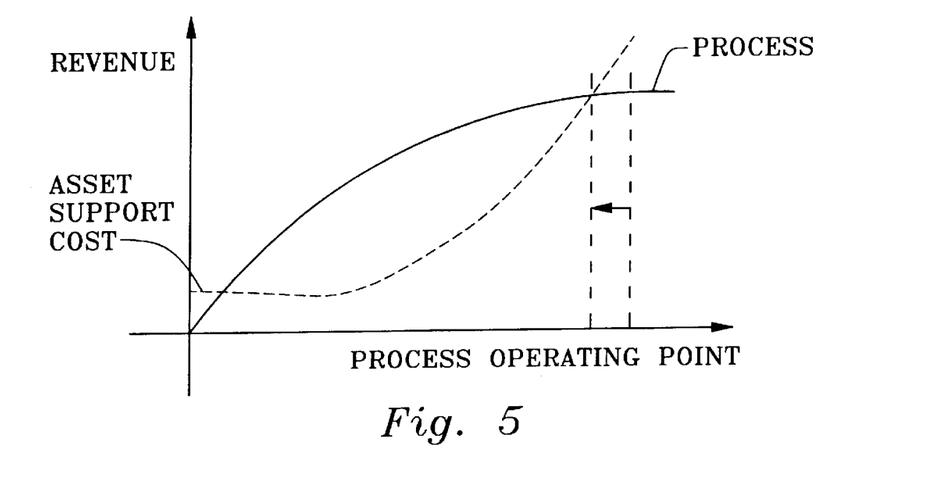
FIG. 5 is a graph detailing asset support cost and process operating point.

The system 10 provides asset management which, inter alia, maximizes an asset's life while minimizing its cost. FIG. 5 shows a graph of optimization of assets and processes simultaneously to maximize profits.

In use and operation, the system 10 provides analysis of an instrument malfunction and a machinery problem as follows. An instrument malfunction will be handled by the system 10 as follows: in this example the players are the plant maintenance department and a remote instrument manufacturer service department. In the maintenance office a supervisor receives an advisory on an instrument which is starting to malfunction. The advisory has been generated by the system 10 which uses knowledge bases to continuously monitor information from sensors installed into the machine and processes.

The system encourages customization and easily accommodates a particular operating methodology and procedures to be embedded in the system 10 rules. In this case the company's methodology is to notify the company's operators only if the problem has the potential for near term impact on operations. Thus, the system 10 is configured accordingly and the operators are not notified of the instrument problem. However, an advisory is simultaneously and immediately sent to the instrument manufacturer service department. The instrumentation service department takes responsibility for the maintenance of the instruments and sensors which are used to monitor assets in the plant. The theory behind this is that it is more economical for the supplier to train one hundred service people than it is one thousand plants training a hundred service people each. Therefore, the initial instrumentation advisory is handled by the instrument manufacturer service department and is corrected before the advisory is allowed to take up the operator's time. More specifically, for example, if on Wednesday there is a single spike from a transducer and on Thursday there are two spikes and then on Friday the transducer totally fails, the system 10 prior to the total failure would have sent an advisory on the initial spike to the instrumentation department and the instrumentation service department would have obtained the part and schedule its replacement prior to the total failure on Friday.

A second example will be how the system 10 handles a machinery problem. The system 10, according to the plant's operating methodology, determines if a problem is serious enough such that an advisory is sent to the machine maintenance people and operators. The severity levels with their accompanying advisories are where lessons may be learned from during one shift and used years later by another shift. Thus, the system provides an effective way of documenting corporate learning.

An advisory on a machine problem would be sent to a local service office which confirms by, for example, e-mail that the advisory has been reviewed and it is not instrument related. Then the advisory would be sent to the machinery supplier who takes responsibility for their products just as the instrument suppliers take responsibility for their products. The machinery suppliers have their own systems which enable the investigation of the condition of the machinery through remote access. The machinery of today has become much more reliable and the availability of information has increased the effectiveness of fundamental cause analysis. Therefore, the machinery supplier can identify the problem without interfering with the operation and without interrupting a large group of plant personnel.

A more specific example may be a pump which is in cavitation. The system would discern this and send an advisory to both an operator and a remote service person. The flow of the pump then may be changed resulting in this example in a reduced vibration. Previously, the pump may have run in cavitation for weeks and perhaps even months thereby resulting in premature pump failure.

When the problem is more complicated other expertise is used and sources of deep knowledge and the information may be accessed by the system 10.

With fewer people on site quick and effective access to deep knowledge wherever it is globally may be accessed to address problems which have been previously overlooked or ignored.

Machinery protection and machinery management have been differentiated and defined as follows. Machinery protection is: products which provide shutdown of a machine or return it to its safe or non-destructive mode of operation without human intervention. The goals of machinery protection are as follows: to provide personnel safety, limit environmental impact, prevent or minimize machine damage and have no faults, trips or missed trips.

Machinery management is defined as: products which provide data and information which is interrupted and applied by people to correctly operate, maintain and monitor the condition of their machinery. The goals of machinery management are: maximized machine availability by having no unscheduled downtime and minimize outage duration, reduce operation and maintenance cost, reduce time to actionable information and fundamental cause and provide remote data communication.

The advantages of the system 10 benefit both the user and the supplier of the assets as well. When the provider of the machine has access to the right information the supplier can and will communicate when installation or operation of the equipment should be changed to optimize the machine and process performance. Thereby, many problems can be corrected and the life of the machine may be significantly extended.

Furthermore, when a plant is scheduling a shutdown the system 10 can coordinate the knowledge of many data bases to make decisions on which machines need maintenance and which machines can continue to operate until the next scheduled shutdown. Thus, if machines are worked on only when they need maintenance the possibility of inducing problems or damage during inspection or maintenance is significantly reduced.

In order to determine what machines to work on the supplier of the assets and instrumentations can provide expertise to the system 10 to help determine which machines need attention and which machines can be left alone. Thus, the structure of the system 10 actually provides economic incentive to the partners.

The system 10 provides plant-wide machinery information integration and an on-line machinery diagnostic system in which operators are supplied with actionable information to prevent machine damage and keep the plant process running optimally.

The machinery management system 10 will fully integrate with the plant optimization process. Thus, this will allow the plant to not only optimize the process, which is the current practice, but will allow the plant to optimize the assets by using the system 10 according to the present invention. Therefore, this allows the company to optimize the entire plant for long term profit potential.

In summary, the system 10 allows people having a specific expertise to evaluate the data and make recommendations without having to be on site. This allows expertise from the plant, machinery management system suppliers and the original equipment manufacturers to work together to solve any specific problem which may occur to the assets of the plant.

The system accomplishes this by having properly monitored machines coupled to remote diagnostic systems which integrate seamlessly with the specific plant control system and plant information system. Thus, the system 10 provides the means to reach the goal of reducing operation and maintenance cost while maintaining operating integrity of the plant.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. Means for incorporating prior relevant experiences and knowledge into a management system, comprising in combination:

a hierarchical data base with means for weighting and adhering to certain rule sets while overriding other rule sets, input means which senses systems to be sampled and coupled to said data base, output coupled to said data base including selection means to target said output only to relevant entities, and further including configuration means operatively coupled to said hierarchical data base for appending additional attributes and rule sets which will adhere to certain prior attributes and rule sets while overriding others.

2. The means of claim 1 further including means for precluding transfer of the appended attributes and rule sets of one supplier to another during loading of the attributes and rule sets into the management system.

3. A method for protecting industrial assets, comprising the steps of:

loading information into a shell of an expert system such that the expert system receives hierarchical rule sets some of which are used to analyze asset information, appending additional attributes and rule sets to the system which will adhere to certain prior attributes and rule sets while overriding others, monitoring assets and transmitting asset information to the expert system, reporting to entities from the expert system who need to act on information processed by the expert system.

4. Means for incorporating prior relevant experiences and knowledge into a management system, comprising in combination:

a hierarchical data base with means for weighting and adhering to certain rule sets while overriding other rule sets, input means which senses systems to be sampled and coupled to said data base, output coupled to said data base including selection means to target said output only to relevant entities, and further including configuration means operatively coupled to said hierarchical data base for appending additional attributes and rule sets which will adhere to certain prior attributes and rule sets while overriding others, including means for precluding transfer of trade secrets from one attribute and rule set supplier to another during loading of information into the expert system.

5. The means of claim 4 wherein reporting, to entities from the expert system includes the step of processing severity level signals, fault category signals and asset with problem signals.

6. A knowledge manager relying on a hierarchical default expert system operatively coupled to a plurality of sensors for receiving information signals on a plurality of assets being monitored in a plant, said system comprising in combination:

a system processor including an expert system shell and a class hierarchical knowledge data base;

a first stage processor and knowledge data base operatively coupled to said system processor for providing bidirectional communication of data therebetween;

configuration means operatively coupled to said first stage processor and knowledge base for communicating parameters of the assets to said first stage for processing and communicating said parameters to said system processor;

said system processor including means to instantiate said parameters into objects including attributes and rule sets representative of the assets being monitored and means for appending said objects to said class hierarchical knowledge data base wherein said objects take priority when auditing an asset train.

7. The system of claim 6 further including an information extractor interposed between the sensors and the first stage processor and knowledge data base for extracting key parameters from the raw data outputted from the sensors.

8. The system of claim 7 wherein said configuration means includes knowledge modules having memory means on which proprietary information such as attributes and methodology of an asset have been stored.

9. The system of claim 8 wherein said system includes means for precluding the disclosure of the proprietary information contained in said knowledge modules during downloading of the information into the first stage processor and knowledge base.

10. The system of claim 9 wherein said system includes a message routing system which determines where to route a message correlative to an actionable demand by the system.

11. The system of claim 10 further including an information only field bus communicating information from the sensors to said system.

12. A knowledge manager relying on a hierarchical default expert system operatively coupled to a plurality of sensors for receiving information signals on a plurality of assets being monitored in a plant, said system comprising in combination:

a system processor including an expert system shell and a class hierarchical knowledge data base:

a first stage processor operatively coupled to said system processor for communicating data therebetween;

configuration means operatively coupled to said first stage processor for communicating parameters of the assets to said first stage for processing and communicating said parameters to said system processor;

further including an information extractor interposed between the sensors and the first stage processor and knowledge data base for extracting key parameters from the raw data outputted from the sensors.

13. A knowledge manager relying on a hierarchical default expert system operatively coupled to a plurality of sensors for receiving information signals on a plurality of assets being monitored in a plant, said system comprising in combination:

a system processor including an expert system shell and a class hierarchical knowledge data base;

a first stage processor operatively coupled to said system processor for communicating data therebetween;

configuration means operatively coupled to said first stage processor for communicating parameters of the assets to said first stage for processing and communicating said parameters to said system processor:

wherein said configuration means includes knowledge modules having memory means on which proprietary information such as attributes and methodology of an asset have been stored.

14. The system of claim 13 wherein said system includes means for precluding the disclosure of the proprietary information contained in said knowledge modules during downloading of the information into said first stage processor.

15. A knowledge manager relying on a hierarchical default expert system operatively coupled to a plurality of sensors for receiving information signals on a plurality of assets being monitored in a plant, said system comprising in combination:

a system processor including an expert system shell and a class hierarchical knowledge data base;

a first stage processor operatively coupled to said system processor for communicating data therebetween;

configuration means operatively coupled to said first stage processor for communicating parameters of the assets to said first stage for processing and communicating said parameters to said system processor;

wherein said system includes a message routing system which determines where to route a message correlative to an actionable demand by the system.

16. A knowledge manager relying on a hierarchical default expert system operatively coupled to a plurality of sensors for receiving information signals on a plurality of assets being monitored in a plant, said system comprising in combination:

a system processor including an expert system shell and a class hierarchical knowledge data base:

a first stage processor operatively coupled to said system processor for communicating data therebetween;

configuration means operatively coupled to said first stage processor for communicating parameters of the assets to said first stage for processing and communicating said parameters to said system processor;

further including an information only field bus communicating information from the sensors to said system.

* * * * *